(12) United States Patent
Somasundaram et al.

(10) Patent No.: US 9,532,377 B2
(45) Date of Patent: Dec. 27, 2016

(54) SYSTEM LEVEL INFORMATION FOR DISCONTINUOUS RECEPTION, CELL RESELECTION AND RACH

(71) Applicant: INTERDIGITAL PATENT HOLDINGS, INC., Wilmington, DE (US)

(72) Inventors: Shankar Somasundaram, Sunnyvale, CA (US); Peter S. Wang, E. Setauket, NY (US); Jin Wang, Princeton, NJ (US); Ulises Olvera-Hernandez, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/918,960

(22) Filed: Oct. 21, 2015

(65) Prior Publication Data

US 2016/0192393 A1 Jun. 30, 2016

Related U.S. Application Data

(63) Continuation of application No. 12/185,546, filed on Aug. 4, 2008, now Pat. No. 9,173,167.

(Continued)

(51) Int. Cl.
*H04W 74/08* (2009.01)
*H04W 74/00* (2009.01)
(Continued)

(52) U.S. Cl.
CPC ........ *H04W 74/008* (2013.01); *H04J 11/0069* (2013.01); *H04W 36/0005* (2013.01); *H04W 36/04* (2013.01); *H04W 48/08* (2013.01); *H04W 52/0216* (2013.01); *H04W 52/0225* (2013.01); *H04W 74/08* (2013.01);
(Continued)

(58) Field of Classification Search
None
See application file for complete search history.

(56) References Cited

U.S. PATENT DOCUMENTS 6,205,333 B1 3/2001 Abe et al.
6,621,803 B2 9/2003 Halton et al.
(Continued)

FOREIGN PATENT DOCUMENTS

EP 1499144 A1 8/2004
EP 1509056 A2 2/2005
(Continued)

OTHER PUBLICATIONS

3rd Generation Partnership Project (3GPP), R2-071261, "Explicit DRX Control", Research in Motion Limited, 3GPP TSG RAN WG2 Meeting #57bis, Mar. 26-30, 2007, pp. 1-2.
(Continued)

*Primary Examiner* — Mohammad Adhami
(74) *Attorney, Agent, or Firm* — Condo Roccia Koptiw, LLP

(57) ABSTRACT

A wireless transmit/receive unit is configured to receive system level information, including discontinuous reception (DRX) information, cell selection information, and RACH information. The system level information is received as defined parameters assigned to system information blocks or signaled through dedicated RRC signaling.

29 Claims, 1 Drawing Sheet

Related U.S. Application Data

(60) Provisional application No. 60/953,816, filed on Aug. 3, 2007.

(51) Int. Cl.

| | | |
|---|---|---|
| H04J 11/00 | (2006.01) | |
| H04W 36/00 | (2009.01) | |
| H04W 36/04 | (2009.01) | |
| H04W 48/08 | (2009.01) | |
| H04W 76/04 | (2009.01) | |
| H04W 52/02 | (2009.01) | |
| H04W 48/16 | (2009.01) | |

(52) U.S. Cl.
CPC .......... *H04W 76/048* (2013.01); *H04W 48/16* (2013.01); *Y02B 60/50* (2013.01)

(56) References Cited

U.S. PATENT DOCUMENTS

| | | | |
|---|---|---|---|
| 6,697,346 | B1 | 2/2004 | Halton et al. |
| 7,187,934 | B2 | 3/2007 | Turina et al. |
| 7,197,323 | B2 | 3/2007 | Terry |
| 8,315,214 | B2 | 11/2012 | Womack et al. |
| 8,451,741 | B2 | 5/2013 | Enstrom et al. |
| 8,559,342 | B2 | 10/2013 | Kim et al. |
| 2002/0041578 | A1 | 4/2002 | Kim et al. |
| 2003/0095528 | A1 | 5/2003 | Halton et al. |
| 2004/0116126 | A1* | 6/2004 | Cave ................ H04W 74/002 455/450 |
| 2004/0198221 | A1* | 10/2004 | Bin .................... H04W 74/02 455/41.1 |
| 2004/0224684 | A1 | 11/2004 | Dorsey et al. |
| 2004/0224689 | A1 | 11/2004 | Raghuram et al. |
| 2005/0032542 | A1 | 2/2005 | Wilborn et al. |
| 2005/0271025 | A1* | 12/2005 | Guethaus ............ H04W 74/008 374/342 |
| 2006/0146858 | A1 | 7/2006 | Kim |
| 2007/0178875 | A1 | 8/2007 | Rao et al. |
| 2007/0291729 | A1 | 12/2007 | Dalsgaard et al. |
| 2008/0101268 | A1 | 5/2008 | Sammour et al. |
| 2008/0181127 | A1 | 7/2008 | Terry et al. |
| 2008/0227453 | A1 | 9/2008 | Somasundaram et al. |
| 2008/0253323 | A1 | 10/2008 | Fischer |
| 2009/0042576 | A1 | 2/2009 | Mukherjee et al. |
| 2009/0088160 | A1 | 4/2009 | Pani et al. |
| 2009/0207802 | A1* | 8/2009 | Lee .................... H04L 1/1832 370/329 |
| 2010/0330998 | A1 | 12/2010 | Park et al. |

FOREIGN PATENT DOCUMENTS

| | | |
|---|---|---|
| EP | 1739990 A1 | 3/2007 |
| JP | 11-220433 A | 8/1999 |
| JP | 2002539730 A | 11/2002 |
| JP | 2003-153325 A | 5/2003 |
| JP | 2005-260906 A | 9/2005 |
| JP | 2006-121172 A | 5/2006 |
| JP | 2008-523711 A | 7/2008 |
| TW | M240063 U | 8/2004 |
| TW | 2006-35411 A | 10/2006 |
| TW | 2007-18230 A | 5/2007 |
| TW | 2007-23809 A | 6/2007 |
| WO | WO 00/56095 | 9/2000 |
| WO | WO 2006/065198 A1 | 6/2006 |
| WO | WO 2006/118426 A1 | 11/2006 |
| WO | WO 2006/104335 A2 | 7/2007 |
| WO | WO 2007/111480 A1 | 10/2007 |

OTHER PUBLICATIONS

3rd Generation Partnership Project (3GPP), R2-072409, "Stage 3 Topics of Random Access Procedure", Nokia, Nokia Siemens Networks, 3GPP TSG-RAN WG2, Meeting# 58 bis, Orlando, U.S.A, Jun. 25-29, 2007, 4 pages.

3rd Generation Partnership Project (3GPP), R2-072620, "RLC Status Report Trigger", LG Electronics Inc., 3GPP TSG-RAN WG2 #58bis, Jun. 25-29, 2007, pp. 1-3.

3rd Generation Partnership Project (3GPP), R2-072742, "Multiple RA Response", Mobile Competence Centre, 650, Route DES Lucioles, F06921, Sophia-Antipolis Cedex, France, vol. RAN WG2 #58 bis, Jun. 25-29, 2007, pp. 1-2.

3rd Generation Partnership Project (3GPP), TS 23.122 V3.1.1, "Technical Specification Group Core Network, NAS Functions Related to Mobile Station (MS) in Idle Mode", Feb. 2000, pp. 1-31.

3rd Generation Partnership Project (3GPP), TS 25.304 V3.14.0, "Technical Specification Group Radio Access Network, User Equipment (UE) Procedures in Idle Mode and Procedures for Cell Reselection in Connected Mode (Release 1999)", Mar. 2004, pp. 1-41.

3rd Generation Partnership Project (3GPP), TS 25.304 V4.8.0, "Technical Specification Group Radio Access Network, User Equipment (UE) Procedures in Idle Mode and Procedures for Cell Reselection in Connected Mode (Release 4)", Mar. 2004, pp. 1-41.

3rd Generation Partnership Project (3GPP), TS 25.304 V5.9.0, "Technical Specification Group Radio Access Network, User Equipment (UE) Procedures in Idle Mode and Procedures for Cell Reselection in Connected Mode (Release 5)", Sep. 2005, pp. 1-44.

3rd Generation Partnership Project (3GPP), TS 25.304 V6.10.0, "Technical Specification Group Radio Access Network, User Equipment (UE) Procedures in Idle Mode and Procedures for Cell Reselection in Connected Mode (Release 6)", Mar. 2008, pp. 1-38.

3rd Generation Partnership Project (3GPP), TS 25.304 V6.9.0, "Technical Specification Group Radio Access Network, User Equipment (UE) Procedures in Idle Mode and Procedures for Cell Reselection in Connected Mode (Release 6)", Mar. 2006, pp. 1-38.

3rd Generation Partnership Project (3GPP), TS 25.304 V7.2.0, "Technical Specification Group Radio Access Network, User Equipment (UE) Procedures in Idle Mode and Procedures for Cell Reselection in Connected Mode (Release 7)", Jun. 2007, pp. 1-41.

3rd Generation Partnership Project (3GPP), TS 25.304 V7.6.0, "Technical Specification Group Radio Access Network, User Equipment (UE) Procedures in Idle Mode and Procedures for Cell Reselection in Connected Mode (Release 7)", May 2008, pp. 1-41.

3rd Generation Partnership Project (3GPP), TS 25.304 V8.2.0, "Technical Specification Group Radio Access Network, User Equipment (UE) Procedures in Idle Mode and Procedures for Cell Reselection in Connected Mode (Release 8)", May 2008, pp. 1-41.

3rd Generation Partnership Project (3GPP), TS 25.304, V7.1.0, "Technical Specification Group Radio Access Network, User Equipment (UE) Procedures in Idle Mode and Procedures for Cell Reslection in Connected Mode (Release 7)", Dec. 2006, pp. 1-38.

3rd Generation Partnership Project (3GPP), TS 25.331 V3.21.0, "Technical Specification Group Radio Access Network, Radio Resource Control (RRC), Protocol Specification (Release 1999)", Dec. 2004, pp. 1-879.

3rd Generation Partnership Project (3GPP), TS 25.331 V4.17.0, "Technical Specification Group Radio Access Network, Radio Resource Control (RRC), Protocol Specification (Release 4)", Mar. 2005, pp. 1-953.

3rd Generation Partnership Project (3GPP), TS 25.331 V4.19.0, "Technical Specification Group Radio Access Network, Radio Resource Control (RRC), Protocol Specification (Release 4)", May 2008, pp. 1-953.

3rd Generation Partnership Project (3GPP), TS 25.331 V5.19.0, "Technical Specification Group Radio Access Network, Radio Resource Control (RRC), Protocol Specification (Release 5)", Dec. 2006, pp. 1-1045.

3rd Generation Partnership Project (3GPP), TS 25.331 V5.22.0, "Technical Specification Group Radio Access Network, Radio Resource Control (RRC), Protocol Specification (Release 5)", May 2008, pp. 1-1045.

3rd Generation Partnership Project (3GPP), TS 25.331 V6.14.0, "Technical Specification Group Radio Access Network, Radio Resource Control (RRC), Protocol Specification (Release 6)", Jun. 2007, pp. 1-1247.

(56) References Cited

OTHER PUBLICATIONS

3rd Generation Partnership Project (3GPP), TS 25.331 V6.18.0, "Technical Specification Group Radio Access Network, Radio Resource Control (RRC), Protocol Specification (Release 6)", May 2008, pp. 1-1252.

3rd Generation Partnership Project (3GPP), TS 25.331 V7.5.0, "Technical Specification Group Radio Access Network, Radio Resource Control (RRC), Protocol Specification (Release 7)", Jun. 2007, pp. 1-1429.

3rd Generation Partnership Project (3GPP), TS 25.331 V7.9.0, "Technical Specification Group Radio Access Network, Radio Resource Control (RRC), Protocol Specification (Release 7)", May 2008, pp. 1-1475.

3rd Generation Partnership Project (3GPP), TS 25.331 V8.3.0, "Technical Specification Group Radio Access Network, Radio Resource Control (RRC), Protocol Specification (Release 8)", May 2008, pp. 1-1494.

3rd Generation Partnership Project (3GPP), TS 36.213 V1.2.0, "Technical Specification Group Radio Access Network, Technical Specification Group Radio Access Network, Physical Layer Procedures (Release 8)", May 2007, pp. 1-10.

3rd Generation Partnership Project (3GPP), TS 36.213 V8.3.0, "Technical Specification Group Radio Access Network, Evolved Universal Terrestrial Radio Access (E-UTRA), Physical Layer Procedures (Release 8)", May 2008, pp. 1-45.

3rd Generation Partnership Project (3GPP), TS 36.300 V8.1.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Jun. 2007, pp. 1-106.

3rd Generation Partnership Project (3GPP), TS 36.304 V8.2.0, "Technical Specification Group Radio Access Network, Evolved Universal Terrestrial Radio Access (E-UTRA), User Equipment (UE) Procedures in Idle Mode (Release 8)", May 2008, pp. 1-27.

3rd Generation Partnership Project (3GPP), TS 36.331 V8.2.0, "Technical Specification Group Radio Access Network, Evolved Universal Terrestrial Radio Access (E-UTRA) Radio Resource Control (RCC), Protocol Specification (Release 8)", May 2008, pp. 1-151.

European Telecommunications Standard Institute (ETSI), TS 136 300 V8.1.0, "Universal Mobile Telecommunications System (UMTS), Evolved Universal Terrestrial Radio Access (E-UTRA) and Evolved Universal Terrestrial Radio Access (E-UTRAN), Overall Description, Stage 2 (3GPP TS 36.300 version 8.1.0 Release 8)", Jun. 2007, pp. 1-108.

European Telecommunications Standards Institute (ETSI), TS 125 304 V6.9.0, "Universal Mobile Telecommunications System (UMTS), User Equipment (UE) Procedures in Idle Mode and Procedures for Cell Reselection in Connected Mode (3GPP TS 25.304 version 6.9.0 Release 6)", Mar. 2006, pp. 1-40.

European Telecommunications Standards Institute (ETSI), TS 125 331 V7.5.0, "Universal Mobile Telecommunications Systems (UMTS), Radio Resource Control (RRC), Protocol Specification (3GPP TS 25.331 version 7.5.0 Release 7)", Jun. 2007, pp. 1-1431.

Khan, "Impact of DRX on VoIP Performance and Battery Life in LTE", Blekinge Institute of Technology, Sweden School of Engineering and University of Kalmar, Sweden Department of Technology, Chapter 4, Nov. 2008, 4 pages.

$3^{rd}$ Generation Partnership Project (3GPP), R2-063120, "DRX Operations for Connected Mode UEs in LTE", Samsung, 3GPP TSG-RAN2 Meeting #56, Riga, Latvia, Nov. 6-10, 2006, 3 pages.

$3^{rd}$ Generation Partnership Project (3GPP), R2-071285, "DRX Parameters in LTE", Nokia, 3GPP TSG-Ran WG2, Meeting #57bis, St. Julian's, Malta, Mar. 26-30, 2007, 7 pages.

$3^{rd}$ Generation Partnership Project (3GPP), R2-071783, "DRX Handling Issues in LTE", Panasonic, 3GPP TSG Ran WG2 #58, Kobe, Japan, May 7-11, 2007, 4 pages.

* cited by examiner

SYSTEM LEVEL INFORMATION FOR DISCONTINUOUS RECEPTION, CELL RESELECTION AND RACH

CROSS REFERENCE TO RELATED APPLICATIONS

This application is a continuation of U.S. patent application Ser. No. 12/185,546, filed Aug. 4, 2008, which claims the benefit of U.S. Provisional Application No. 60/953,816, filed Aug. 3, 2007, the entire contents of both of which being incorporated by reference as if fully set forth herein, for all purposes.

FIELD OF INVENTION

The present application is related to wireless communications.

BACKGROUND

The Third Generation Partnership Project (3GPP) has initiated the Long Term Evolution (LTE) program to bring new technology, new network architecture, new configurations and new applications and services to wireless cellular networks in order to provide improved spectral efficiency and faster user experiences.

In order for a wireless transmit receive unit (WTRU 101) to perform various procedures related to sleep, monitoring the paging cycles, cell reselection or using a random access channel (RACH), a network would typically signal a number of parameters to the WTRU in system information messages. Some of these parameters can also be used when the WTRU is in an active state, including, but not limited to, reduced neighbor cell lists, measurement reporting and handover parameters. There is a need to put all necessary parameters together and group them into system information messages for use by the WTRU in procedures and methods for sleep, reselection or RACH procedures.

Within a core network (CN) domain system information, information for a discontinuous reception (DRX) would typically be signaled to a WTRU 101 in idle mode in an information element (IE) (e.g., CN_DRX_cycle_length_coefficient). However, DRX exists in active mode as well as idle mode. Therefore, it would be beneficial to signal a DRX cycle length for the active mode.

When a WTRU 101 is camped on a cell, it regularly searches for a better cell according to a set of criteria. If a better cell is found, that cell is selected. In an LTE system with only two states LTE_Idle and LTE_active, the WTRU 101 can perform cell reselection only in the LTE_Idle state. The WTRU 101 uses parameters broadcasted from the system, including, but not limited to the following parameters that are transmitted in a system information block (SIB), such as SIB 3, SIB 4 and/or SIB 11:

$Q_{hyst1s}$: Used in ranking serving cell based on RSCP.
$Q_{hyst2s}$: Used in ranking serving cell based on Ec/Io.
$Q_{qualmin}$: Minimum required quality measure based on Ec/Io.
$Q_{rxlevmin}$: Minimum required quality measure based on a received signal power measurement (e.g., received signal code power (RSCP)).
Delta$_{Qrxlevmin}$: (conditional on value Delta) If present, the actual value of $Q_{rxlevmin}$+Delta$_{Qrxlevmin}$.
UE_TXPWR_MAX_RACH: Maximum allowed uplink (UL) TX power
$S_{intrasrch}$ (optional): Measure intra-frequency neighbor cells when $S_{qual} \leq S_{intrasearch}$, where Squal is based on measured signal to interference ration of a corresponding cell measured by the WTRU 101 minus $Q_{qualmin}$.
$S_{intersrch}$ (optional): Measure inter-frequency neighbor cells when $S_{qual} \leq S_{intersearch}$.
$S_{searchHCS}$ (optional): Measure inter-Hierarchal Cell Structure (HCS)/inter-frequency neighbor cells when $S_{qual} \leq S_{searchHCS}$.
$S_{HCS,RAT}$ (optional): Measure inter-Hierarchal Cell Structure (HCS)/RAT neighbor cells when $S_{qual} \leq S_{HCS,RAT}$.
$S_{limit,SearchRAT}$ (optional): This threshold is used in the measurement rules for cell re-selection when HCS is used. It specifies the RAT specific threshold (in dB) in the serving UTRA cell above which the UE may choose to not perform any inter-RAT measurements in RAT "m".

SUMMARY

A wireless transmit/receive unit (WTRU 101) is configured to receive system level information, such as discontinuous reception (DRX) information, cell reselection information and random access channel (RACH) information, in the form of system information blocks (SIBs) or dedicated radio resource control (RRC) message signaling. The WTRU 101 autonomously processes the received parameters and alters its behavior with respect to sleep mode, cell reselection and using RACH signatures.

One or more techniques are contemplated for a wireless transmit/receive unit (WTRU), that may include receiving, via a receiver, information as a plurality of parameters defined as information elements (IEs) for a physical random access channel (PRACH) operation of the WTRU. Techniques may include processing, via a processor, the received parameters to perform PRACH operations by the WTRU. The IEs may include PRACH system information. The PRACH system information may include a random access channel (RACH) response window size. The RACH response window size may be provided as a number of subframes. Techniques may include receiving, via the receiver, one or more RACH responses sent to the WTRU over the RACH response window.

One or more techniques are contemplated for an evolved NodeB (eNB), where the eNB may include a processor. The processor may be configured to determine a plurality of parameters for physical random access channel (PRACH) operations. The plurality of parameters may include PRACH system information. The PRACH system information may include a random access channel (RACH) response window size. The RACH response window size may be provided as a number of subframes. The eNB may include a transmitter. The transmitter may be configured to transmit the plurality of parameters defined as information elements (IEs) for a PRACH operation of a wireless transmit/receive unit (WTRU). The transmitter may be configured to transmit one or more RACH responses to the WTRU over the RACH response window.

BRIEF DESCRIPTION OF THE DRAWING

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
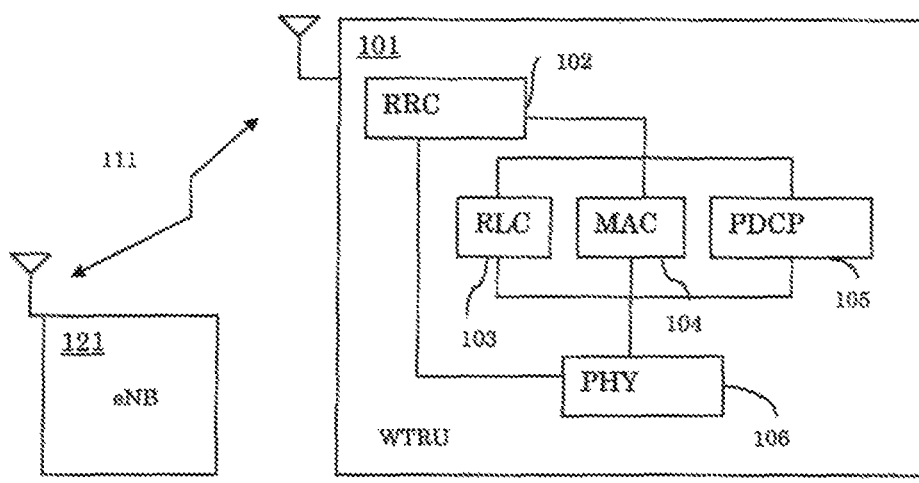
FIG. 1 shows a discontinuous reception (DRX) cycle.

FIG. 1 shows a WTRU 101 comprising a protocol layer stack that includes the following layers: radio resource control RRC 102, radio link control (RLC) 103, medium access control (MAC) 104, packet data convergence protocol (PDCP) 105, and a physical (PHY) layer 106. These layer entities may be implemented as a single processor or separate processors. The WTRU 101 receives system level information from an evolved NodeB (eNB) 121 in a wireless downlink signal 111. The system level information may be defined in units of system information blocks (SIBs) and parameters within each of the SIBs may be used by the WTRU 101 for various processes which will be explained in further detail. The parameters may be defined into groups of information elements (IEs), which can be processed, for example, by the RRC 102 for controlling operation of the other layer entities. One example includes the RRC 102 receiving DRX parameters and then instructing the PHY 106 to sleep during the designated DRX cycle parameters.

In a first example of defining SIBs with system level information, a system information block 1 (SIB1) may be defined by information elements and related information as shown in Table 1. Each of the IEs shown in Table 1, as well as all tables shown herein, may be defined and provided to the WTRU 101 on a need basis that includes, but is not limited to, the following: mandatory, mandatory with a default value available, conditional on a value, or optional.

TABLE 1

| Group Name | Information Element | Type and reference | Semantics description |
|---|---|---|---|
| CN information elements | CN common GSM-MAP NAS system information >Domain system information | NAS system information (GSM-MAP) Domain system information (for PS domain) | |
| WTRU 101 information | WTRU Timers and constants in idle mode | WTRU Timers and constants in idle mode | The WTRU 101 behaviour is unspecified if this IE is absent. |
| | WTRU Timers and constants in active (connected) mode | WTRU Timers and constants in active (connected) mode | |

As shown in Table 1, the core network (CN) IEs include common GSM-mobile application part (MAP) non-access stratum (NAS) system information and domain system information for the packet switched (PS) domain. These IEs inform the WTRU 101 about the serving CN and domain system. The LTE network operates only in a packet switched (PS) domain. Therefore, there is no need to maintain any other domain information. Only PS domain information is required to be signaled.

In the LTE specification, DRX operates in both explicit and implicit modes. DRX parameters may be signaled by two IEs that can carry specific DRX parameters for each mode of operation. The IE can carry both DRX explicit mode parameters and DRX implicit mode parameters. These IEs can be signaled with the domain system information or may be transmitted with another message, such as a RRC_Connection_Command message for example.

Figure 2:
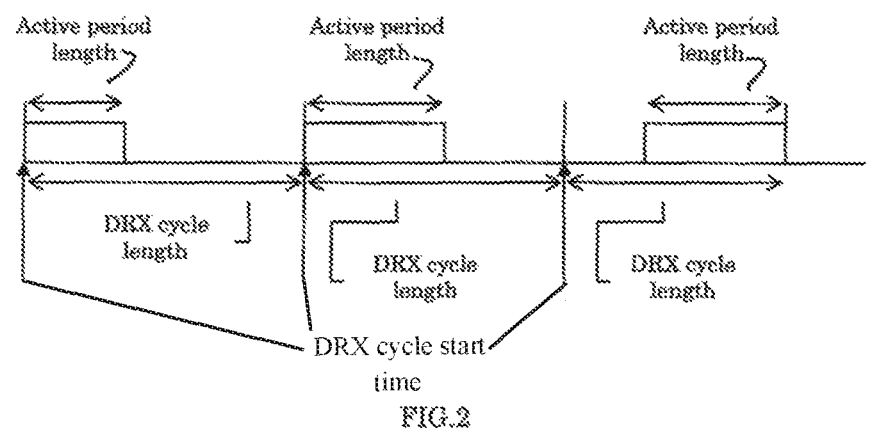
FIG. 2 shows a protocol layer stack configuration for a wireless transmit/receive unit receiving system level information from an evolved Node-B.

FIG. 2 shows a set of sequential DRX signal cycles, in which the WTRU 101 has an active period and a sleep period for the remainder of the DRX cycle, allowing the WTRU 101 to reduce battery consumption. The variable DRX parameters for defining the DRX cycle are the DRX cycle start time, the active period length and the DRX cycle length. For LTE idle mode, the WTRU 101 monitors system paging only during the active period. For LTE active mode, or RRC connected mode, the WTRU 101 only receives data during the active period. Adjustments to DRX parameters may become necessary, for example, to overcome poor channel conditions or to increase the amount of data reception upon the transition from LTE idle mode to LTE active mode. For DRX configuration, if the WTRU 101 is in LTE active mode, the network can signal the same or different parameters as for the WTRU 101 in LTE idle mode. Also, the network may group the parameters and identify the group with a DRX profile identifier (ID). This may enable the network to signal the WTRU 101 to use a particular profile. The signaling received by the WTRU 101 may be through RRC or MAC signaling and may provide the DRX cycle start time, as shown in FIG. 2.

Table 2 shows an example of LTE idle mode and LTE active mode DRX configuration IEs and associated parameters for this embodiment, for which the WTRU 101 is configured to receive and process. An IE for CN DRX cycle period length in LTE idle mode indicates the length of the entire DRX cycle for the WTRU 101 to use while receiving paging in idle mode. An IE for LTE active mode parameters indicates to the WTRU 101 whether LTE active mode parameters are to be the same as the idle mode parameters, or different than the idle mode parameters. If different, the network may then specify a different set of active mode parameters. In order to allow the WTRU 101 to synchronize to the DRX cycle, an IE for DRX cycle start time is defined. In this example, the cell system frame number (SFN) is used as a reference for the DRX cycle start time. A choice IE, Choice Signaling Method, is defined by the network and received by the WTRU 101 to indicate the type of DRX signaling method being employed, which is either explicit type or implicit type, explained later in further detail with respect to Tables 3 and 4.

TABLE 2

LTE Active mode and LTE Idle mode

| Information Element/ Group name | Type and reference | Semantics description |
|---|---|---|
| CN DRX cycle period length In LTE Idle Mode | Integer (1 . . . x) | Refers to the length of the entire DRX cycle in WTRU Idle mode for paging. |
| LTE_Active Mode DRX parameters | Enumerated (same as Idle, different) | Network specifies whether the Active mode DRX parameters are the same as or different than the Idle mode parameters. If specified that the Active mode DRX parameters are different, network may specify a different set of values for the Active mode parameters. |

TABLE 2-continued

LTE Active mode and LTE Idle mode

| Information Element/Group name | Type and reference | Semantics description |
|---|---|---|
| >DRX Cycle Start Time | Integer (0 . . . 4093) | Configured DRX Cycle in LTE_Active starts on an SFN |
| >CHOICE Signaling method | | |
| >> Explicit | | |
| >>> Explicit DRX Configuration | Explicit DRX Configuration Info (Table 3) | |
| >> Implicit | | |
| >>> Implicit DRX Configuration | Implicit DRX Configuration Info (Table 4) | |

Table 3 shows a summary of an exemplary configuration for information elements used in explicit DRX signaling. As a choice IE, the DRX configuration mode may indicate either a Full Configuration or a Predefined Configuration mode. For the Full Configuration mode, the network provides all of the DRX parameters to the WTRU 101. In the Predefined Configuration mode, the WTRU 101 uses default DRX parameters that are predefined by the network. The DRX profile ID information element can be used for defining different DRX profiles which can be used for changing the DRX lengths and other parameters during various procedures, including 3GPP to non-3GPP handovers.

TABLE 3

Explicit DRX

| Information Element/Group Name | Type and reference | Semantics description |
|---|---|---|
| Choice DRX Configuration Mode | | |
| > Full Configuration | | |
| >>DRX Cycle length in LTE Active mode | Integer (1 . . . X) | DRX Cycle Length in unit of the number of system frames |
| >>Active period length in LTE Active mode | Integer (1 . . . 10) | Active duty cycle length in unit of sub-frames |
| >>Active period position | Enumerated (first, last) | Indicating the active duty period is in the beginning or the end of the cycle |
| >> Active period start sub-frame | Integer (1, . . . , 9) | The sub-frame number at which the active period starts in its first frame, if it is not on frame boundary |
| > Predefined Configuration | | |
| >> DRX profile ID | Integer (1 . . . X) | Network signals a profile ID with the set of already defined parameters when it wants the WTRU 101 to use a predefined configuration |

Table 4 shows a summary of an exemplary configuration for information elements used in implicit DRX signaling. As shown, the IE for Implicit DRX State and Transition List may have multiple instances in the signaling to the WTRU 101, one per maximum number of DRX states. Similar to the Explicit DRX explained above, there is a choice IE for DRX configuration mode, for either a Predefined configuration or a Full Configuration. Under a Full configuration mode, trigger mechanism IEs Trigger-UP-1, Trigger-Down-1 and Trigger-Down-2 are defined. The Trigger-UP-1 IE indicates the WTRU 101 is to move to the next upper level DRX state (i.e., a longer DRX cycle). The Trigger-Down-1 IE is a trigger mechanism for the WTRU 101 to move the next lower level DRX state (i.e., a shorter DRX cycle). For the Trigger-Down-2 IE, the WTRU 101 receives a trigger mechanism to move to the shortest DRX cycle, Level-1. For each of these trigger IEs, a choice IE for Triggering Mechanism includes either a timer or a measurement event, as summarized in Table 5. If a timer trigger mechanism is applied, a timer value IE, Implicit-DRX-triggering-timer, may be included. For a measurement event trigger, an Implicit DRX triggering event IE may be included, based on traffic volume and/or inter-frequency, intra-frequency, inter-RAT, intra-RAT measurement events, and an IE for threshold value to be used for the measurement event may also be included.

TABLE 4

Implicit DRX

| Information Element/Group name | Multiple | Type and reference | Semantics description |
|---|---|---|---|
| Initial DRX state Implicit DRX Transition configured life span | | | Time in seconds |
| Implicit DRX State and Transition List | <1, . . . , maxDRX states> | | |
| CHOICE DRX-Config-Mode | | | |
| > Predefined Configuration | | | |
| CN DRX profile ID | | Integer (1 . . . X) | Network could signal a profile ID with each of the parameters and so the network could signal the WTRU 101 to use a particular DRX profile ID |

TABLE 4-continued

Implicit DRX

| Information Element/ Group name | Multiple | Type and reference | Semantics description |
|---|---|---|---|
| | | | when it wants the WTRU 101 to use a predefined configuration |
| > Full Configuration | | | |
| >>DRX Cycle Length | | Integer | |
| >>Trigger-UP-1 | | Trigger Mechanism (Table 5) | To next upper level DRX State |
| >>Trigger-Down-1 | | Trigger Mechanism (Table 5) | To next lower level DRX state |
| >>Trigger-Down-2 | | Trigger Mechanism (Table 5) | To Level-1 (shortest DRX cycle) trigger |
| >>>DRX Cycle length in LTE Active mode | Integer (1 . . . X) | DRX Cycle Length in unit of the number of system frames | |
| >>>Active period length in LTE Active mode | Integer (1 . . . 10) | Active duty cycle length in unit of sub-frames | |
| >>>Active period position | Enumerated (first, last) | Indicating the active duty period is in the beginning or the end of the cycle [this may not be needed if we have the system define that the active period always starts in the first frame of the DRX cycle] | |
| >>> Active period start sub-frame | Integer (1, . . . , 9) | The sub-frame number at which the active period starts in its first frame, if it is not on the frame boundary | |

TABLE 5

Triggering mechanisms

| Information Element/ Group name | Type and reference | Semantics description |
|---|---|---|
| CHOICE triggering-mechanism | | |
| > Timer | | |
| >>Implicit-DRX-triggering-timer | Integer (10, 20, 50, 100, 200, 500, 1000, . . . X) | Timer value in unit of milli-seconds |
| > Measurement-event | Integer (1 . . . 10) | |
| >>Implicit-DRX-triggering-event | Measurement Event ID | Traffic volume measurement events & inter/intra F/R measurement events |
| >> Event-associated threshold value | | |

Additional IEs provided to the WTRU 101 for defining the DRX cycle may include DRX Cycle length, the active period length, the active period position and the active period start subframe. For the DRX cycle length IE, the parameter indicates the DRX cycle length for LTE active mode in units of system frames and indicating if this DRX parameter is different than the LTE idle mode parameter. The active period length IE indicates the active duty cycle length in sub-frames for LTE active mode, and whether the parameter is different than the LTE idle mode parameter. The active period position IE indicates whether the active duty period is at the beginning or at the end of the DRX cycle whether the parameter is different than the LTE idle mode parameter. If the active period does not start at a frame boundary, then the active period start sub-frame IE provides the sub-frame number at which the active period starts.

In another embodiment, parameters for cell selection and reselection are defined and transmitted in a SIB 3, for example, or one of the other SIBs defined in the 3GPP specifications. Tables 6 and 7 show a summary of an example configuration of IEs containing cell selection and reselection parameters.

TABLE 6

Cell Selection and Reselection

| Information Element/ Group name | Type and reference | Semantics description |
|---|---|---|
| SIB4 Indicator | Boolean | TRUE indicates that SIB4 is broadcast in the cell. |

TABLE 6-continued

Cell Selection and Reselection

| Information Element/<br>Group name | Type and<br>reference | Semantics<br>description |
|---|---|---|
| UTRAN mobility<br>information elements | | |
| Cell identity | Cell identity | |
| Cell selection and<br>re-selection info | Cell selection<br>and re-selection<br>info for SIB3/4 | |
| Cell Access<br>Restriction | Cell Access<br>Restriction | |
| Access Restriction<br>Parameters For<br>PLMN Of MIB | Access<br>Restriction<br>Parameters | This IE specifies the Access Restriction<br>Parameters for WTRUs which have chosen<br>the PLMN in the IE "PLMN identity" of the<br>Master Information Block. |
| Domain Specific<br>Access Restriction<br>For Shared Network | | |
| >CHOICE barring<br>representation | | |
| >> Access<br>Restriction<br>Parameter List | | |
| >>> Access<br>Restriction<br>Parameters For<br>Operator1 | PS Domain<br>Specific<br>Access<br>Restriction<br>Parameters | This IE specifies the Access Restriction<br>Parameters for WTRUs which have chosen<br>the first PLMN in the IE "multiplePLMNs"<br>in the IE "Multiple PLMN List" of the<br>Master Information Block. |
| >>> Access<br>Restriction<br>Parameters For<br>Operator2 | PS Domain<br>Specific<br>Access<br>Restriction<br>Parameters | This IE specifies the Access Restriction<br>Parameters for WTRUs which have chosen<br>the second PLMN in the IE<br>"multiplePLMNs" in the IE "Multiple<br>PLMN List" of the Master Information<br>Block. |
| >>> Access<br>Restriction<br>Parameters For<br>Operator3 | PS Domain<br>Specific<br>Access<br>Restriction<br>Parameters | This IE specifies the Access Restriction<br>Parameters for WTRUs which have chosen<br>the third PLMN in the IE<br>"multiplePLMNs" in the IE "Multiple<br>PLMN List" of the Master Information<br>Block. |
| >>> Access<br>Restriction<br>Parameters For<br>Operator4 | PS Domain<br>Specific<br>Access<br>Restriction<br>Parameters | This IE specifies Access Restriction<br>Parameters for WTRUs which have chosen<br>the fourth PLMN in the IE<br>"multiplePLMNs" in the IE "Multiple<br>PLMN List" of the Master Information<br>Block. |
| >>> Access<br>Restriction<br>Parameters For<br>Operator5 | PS Domain<br>Specific<br>Access<br>Restriction<br>Parameters | This IE specifies the Access Restriction<br>Parameters for WTRUs which have chosen<br>the fifth PLMN in the IE "multiplePLMNs"<br>in the IE "Multiple PLMN List" of the<br>Master Information Block. |
| >> Access<br>Restriction<br>Parameters For<br>All | | |
| >>> Access<br>Restriction<br>Parameters | PS Domain<br>Specific<br>Access<br>Restriction<br>Parameters | This IE specifies the common Access<br>Restriction Parameters applied to all<br>PLMNs in the IE "multiplePLMNs" in the<br>IE "Multiple PLMN List" of the Master<br>Information Block. |

As seen in Table 6, for a choice IE for barring representation, either an IE "Access restriction parameter list" IE or an "Access restriction parameter for all" IE is selected. If the "Access restriction parameter list" IE is applied, then multiple IEs are available for specifying access restriction parameters for WTRUs assigned to a respective public land mobile network (PLMN), which is identified in an IE "multiplePLMNs" in the IE "Multiple PLMN List" in the master information block (MIB). When the "Alternative access restriction parameters for all" IE is chosen, then a set of common access restriction parameters is indicated to the WTRU 101, which is applied to all PLMNs in the IE "multiple PLMNs". As there is one PS domain, the parameters for the CS domain are not specified.

As shown in Table 7, the WTRU 101 may receive an IE for Cell selection and reselection quality measure based on RSRP and/or RSRQ, an IE for radio access technology (RAT) of the candidate cell for selection, and a Treslection IE that indicates the reselection time parameter. With respect to the Qhyst IE, the WTRU 101 may receive the following scaling factors: an IE that indicates a Speed dependent scaling factor, an Inter-frequency Speed dependent scaling factor, and an Inter RAT Speed dependent scaling factor. A Neighbor cell blacklist IE may be received by the WTRU 101 to indicate a list of neighbor cells forbidden by the network for reselection.

Before the WTRU 101 makes received signal measurements for cell selection/reselection, the WTRU 101 may receive and process an UTRAN_min IE or GERAN_Min which indicate the minimum signal power for a UTRAN or GERAN cell, respectively. The IEs Qoffset1 and Qoffset2 may be received by the WTRU 101 to indicate biasing cell measurements

TABLE 7

Cell selection and reselection

| Information Element/Group name | Multiple | Type and reference | Semantics description |
|---|---|---|---|
| Cell selection and reselection quality measure | | Enumerated (RSRP, RSRQ) | Choice of measurement (RSRP or RSRQ) to use as quality measure Q for FDD cells. This IE is also sent to the WTRU in SIB11/12. Both occurrences of the IE should be set to the same value. |
| CHOICE mode | | | |
| >FDD | | | |
| >>$S_{intrasearch}$ | | Integer (−32 ... 20 by step of 2) | If a negative value is received the WTRU considers the value to be 0. [dB] |
| >>$S_{intersearch}$ | | Integer (−32 ... 20 by step of 2) | If a negative value is received the WTRU considers the value to be 0. [dB] |
| >>$S_{searchHCS}$ | | Integer (−105 ... 91 by step of 2) | If a negative value is received the WTRU considers the value to be 0. [dB] |
| >>RAT List | 1 to <maxOtherRAT> | | |
| >>>RAT identifier | | Enumerated (GSM, CDMA2000, UTRAN, any other non 3GPP RAT like WiFi, WiMAx, UMA etc) | |
| >>QSearch_TH | | Integer (−32 ... 20 by step of 2) | In case the value 20 is received the WTRU considers this IE as if it was absent. If a negative value is received the WTRU considers the value to be 0. [dB] |
| >>>$S_{HCS, RAT}$ | | Integer (−105 ... 91 by step of 2) | If a negative value is received the WTRU considers the value to be 0. [dB] |
| >>>$S_{limit, SearchRAT}$ | | Integer (−32 ... 20 by step of 2) | If a negative value is received the WTRU considers the value to be 0. [dB] |
| >>Qqualmin | | Integer (−24 ... 0) | RSRP, [dB] |
| >>Qrxlevmin | | Integer (−115 ... −25 by step of 2) | RSRQ, [dBm] |
| >> Delta$_{Qrxlevmin}$ | | Integer (−4 ... −2 by step of 2) | If present, the actual value of Qrxlevmin = Qrxlevmin + Delta$_{Qrxlevmin}$ |
| >TDD | | | |
| >>$S_{intrasearch}$ | | Integer (−105 ... 91 by step of 2) | If a negative value is received the WTRU considers the value to be 0. [dB] |
| >>$S_{intersearch}$ | | Integer (−105 ... 91 by step of 2) | If a negative value is received the WTRU considers the value to be 0. [dB] |
| >>$S_{searchHCS}$ | | Integer (−105 ... 91 by step of 2) | If a negative value is received the WTRU considers the value to be 0. [dB] |
| >>RAT List | 1 to <maxOther-RAT> | | |
| >>>$S_{search, RAT}$ | | Integer (−105 ... 91 by step of 2) | In case the value 91 is received the WTRU considers this IE as if it was absent. If a negative value is received the WTRU considers the value to be 0. [dB] |

TABLE 7-continued

Cell selection and reselection

| Information Element/ Group name | Multiple | Type and reference | Semantics description |
| --- | --- | --- | --- |
| >>>$S_{HCS, RAT}$ | | Integer (−105 . . . 91 by step of 2) | If a negative value is received the WTRU considers the value to be 0. [dB] |
| >>>$S_{limit, SearchRAT}$ | | Integer (−105 . . . 91 by step of 2) | If a negative value is received the WTRU considers the value to be 0. [dB] |
| >>Qrxlevmin | | Integer (−115 . . . −25 by step of 2) | RSCP, [dBm] |
| >>Delta$_{Qrxlevmin}$ | | Integer (−4 . . . −2 by step of 2) | If present, the actual value of Qrxlevmin = Qrxlevmin + Delta$_{Qrxlevmin}$ [dB] |
| Qhyst1$_s$ | | Integer (0 . . . 40 by step of 2) | |
| Qhyst2$_s$ | | Integer (0 . . . 40 by step of 2) | Default value is Qhyst1$_s$ [dB] |
| Treselection$_s$ | | Integer (0 . . . 31) | [s] |
| Speed dependent ScalingFactor for Treselection | | Real (0 . . . 1 by step of 0.1) | This IE is used by the WTRU in high mobility state as scaling factor for Treselection$_s$ |
| Inter-frequency ScalingFactor for Treselection | | Real (1 . . . 4.75 by step of 0.25) | If present, it is used by the WTRU as scaling factor for Treselection$_s$ for inter-frequency cell reselection evaluation |
| Inter-RAT ScalingFactor for Treselection | | Real (1 . . . 4.75 by step of 0.25) | If present, it is used by the WTRU as scaling factor for Treselection$_s$ for inter-RAT cell reselection evaluation |
| Speed dependent Scaling factor for Qhyst | | Real (0 . . . 1 by step of 0.1) | If present, it is used by the WTRU as scaling factor for Qhyst for inter-RAT cell reselection evaluation |
| Inter-frequency Speed dependent Scaling factor for Qhyst | | Real (1 . . . 4.75 by step of 0.25) | If present, it is used by the WTRU as scaling factor for Qhyst$_s$ for inter-RAT cell reselection evaluation |
| Inter-RAT Speed dependent Scaling factor for Qhyst | | Real (1 . . . 4.75 by step of 0.25) | If present, it is used by the WTRU as scaling factor for Qhyst for inter-RAT cell reselection evaluation |
| Neighbour cell blacklist | | Integer(neighbour cell IDs) | Network can specify the list of cells it does not want the WTRU to reselect to if it so desires |
| Non-HCS_T$_{CRmax}$ | | Enumerated (not used, 30, 60, 120, 180, 240) | [s] Default value is 'not used'. |
| Non-HCS_N$_{CR}$ | | Integer (1 . . . 16) | Default value = 8 |
| Non-HCS_T$_{CRmaxHyst}$ | | Enumerated (not used, 10, 20, 30, 40, 50, 60, 70) | [s] |
| HCS Serving cell Information | | HCS Serving cell information | |
| Maximum allowed UL TX power | | Maximum allowed UL TX power | [dBm] UE_TXPWE_MAX_RACH |
| UTRAN_Min/ | | Minimum value above which the UTRAN cell should be to start measurements. | [dBm] |
| GERAN_Min | | Minimum value above which the GERAN cell should be to start measurements. | [dBm] |
| Qoffset1 | | Value used for biasing the cells for measurement | [dBm] |

TABLE 7-continued

| Cell selection and reselection | | | |
|---|---|---|---|
| Information Element/ Group name | Multiple | Type and reference | Semantics description |
| Qoffset2 | | Another offset value used based on cell loading or any other parameter | [dBm] |
| Tmeas | | Number of seconds between two consecutive measurements in Idle for Inter-RAT | [s] |
| Priority of Inter-RAT reselection | | Priority of RAT selection during the Inter-RAT reselection process. WTRU would follow this list in order. | Enumerated (GSM, cdma2000, UTRAN, any other non 3GPP RAT like WiFi, WiMAx, etc) |

In another embodiment, system level information for a PHY random access channel (PRACH) is defined by parameters in IEs and included into an SIB 5, or another 3GPP specified SIB, to be received and processed by the WTRU 101. Tables 8-10 show a summary of example configurations of such IEs and related information.

As shown in Table 8, a PRACH system information IE may be included with multiple instances from 1 to max-PRACH. A PRACH-info IE for RACH comprises several IEs that are summarized in Table 9. A RACH non-dedicated signature IE indicates dedicated and non-dedicated signatures allocated to the WTRU 101, and comprises several IEs that are summarized in Table 10. A RACH Response Window IE informs the WTRU 101 as to a number of sub-frames over which multiple RACH responses sent to the WTRU 101 are to be received. A PHY downlink control channel (PDCCH) information IE, "PDCCH-Info", provides PDCCH parameters for the PRCAH to the WTRU 101, comprising IEs summarized in Table 12. A routing area-radio network temporary identification (RA-RNTI) List IE, comprising IEs summarized in Table 11, provides RNTI information to the WTRU 101 for the routing area.

TABLE 8

| PRACH system information | | | |
|---|---|---|---|
| Information element | Multiple | Type and reference | Semantics description |
| PRACH system information | 1 ... <maxPRACH> | | |
| >PRACH info | | PRACH info (for RACH), see Table 9 | |
| >CHOICE mode | | | |
| >>FDD | | | |
| >>>Primary CPICH TX power | | Primary TX power | Default value is the value of "Primary Reference Symbol TX power" for the previous PRACH in the list. (The first occurrence is then mandatory) |
| >>>Constant value | | Constant value | Default value is the value of "Constant value" for the previous PRACH in the list. (The first occurrence is then mandatory) |
| >>>PRACH power offset | | PRACH power offset | Default value is the value of "PRACH power offset" for the previous PRACH in the list. (The first occurrence is then mandatory) |
| >>>RACH transmission parameters | | RACH transmission parameters | Default value is the value of "RACH transmission parameters" for the previous PRACH in the list. (The first occurrence is then mandatory) |
| >>>RACH non-dedicated-signature | | RACH non-dedicated-signature parameters See Table 10 | Dedicated and Non dedicated signatures allocated to the WTRU |

TABLE 8-continued

PRACH system information

| Information element | Multiple | Type and reference | Semantics description |
|---|---|---|---|
| >>> RACH Response Window | | Integer (1, . . . , 10) | RACH window (in number of sub-frames) over which multiple responses sent to the WTRU are received. |
| >>>PDCCH Info | | PDCCH info See Table 12 | Default value is the value of "PDCCH info" for the previous PRACH in the list. (The first occurrence is then mandatory) |
| >>> RA-RNTI List | | RA-RNTI Info See Table 11 | Default value is the value of "RA-RNTI List" for the previous PRACH in the list. (The first occurrence is then mandatory) |

As shown in Table 9, WTRU 101 receives PRACH information parameters for frequency division duplex (FDD) and time division duplex (TDD) operation. For FDD, the WTRU 101 may receive a PRACH frequency position IE indicating an integer value within a range starting from the lowest frequency edge of the carrier bandwidth. Alternatively, the integer value may range between negative and positive values centered in the middle of the carrier frequency. Additional parameters received by the WTRU 101 include a PRACH burst type IE (e.g., normal, extended or repeated burst type) and a Channel Coding parameter IE for identifying the turbo code in use. For TDD, the WTRU 101 may receive a PRACH Frame structure type IE and a PRACH Burst Type IE to indicate, for example, a normal or extended burst type.

TABLE 9

PRACH information

| Information Element/ Group name | Type and reference | Semantics description |
|---|---|---|
| CHOICE mode | | |
| >FDD | | |
| >>PRACH Frequency Position (on beginning RB number of the PRACH) | Integer (0, . . . , 105) | Resource Block number scale starts from the lowest frequency edge of the carrier bandwidth |
| OR | | |
| >>PRACH Frequency Position (on beginning RB number of the PRACH) | Integer (−52, . . . , 0, . . . +52) | RB number scale for 105 RBs with center in the middle of the carrier frequency |
| >>PRACH Burst Type | Enumerated (Normal, Extended, Repeated) | |
| >> Channel Coding Parameter | Integer (0, . . . xx) | Identification of the turbo code |
| >>Preamble scrambling code number | Integer (0 . . . 15) | Identification of scrambling code see [28] |
| >>Puncturing Limit | Real (0.40 . . . 1.00 by step of 0.04) | |
| >TDD | | |
| >>PRACH Frame Structure | Enumerated (Type-1, Type-2) | |
| >>PRACH Burst Type | Enumerated (Normal, Extended) | |
| >> TBD | | |

As shown in Table 10, the WTRU 101 may receive a set of RACH parameters defined according to a group G1 for dedicated RACH signatures, a group G2 for consecutive or bit-mapped non-dedicated RACH signatures, or a group G3 for small message consecutive or bit-mapped non-dedicated RACH signatures. Each RACH channel typically has 64 random access signatures of cyclical Z-C codes whose generation/derivation is specified in 3GPP Standards. For system information, the signatures can be identified by their indexes (0, . . . , 63).

When a random access signature group whose signatures are all consecutive in terms of the signature index, it can be defined by [start-index-a, range]. The WTRU 101 then knows and selects the signatures within the defined group since they are consecutive. For example, WTRU 101 receives the Available Dedicated Signatures G1 IE, the Number of Signatures IE with a value 8, and a Begin Signature Index IE with value 8, then WTRU 101 can derive that its RACH signature group is [8-15].

But if the random access signatures in a group is not consecutive, then the above described signature index mapping IE is replaced by the alternative bit-mapped signature index, shown in Table 10 as the Signature Map IE. For the bit-mapped signature mapping, the WTRU 101 receives a bit string which indicates a set of available signatures in the random access signature group according to a predefined signature map. The Signature map IE use a bitmap with 64 bits, or with a first start-index-a, and a subsequent bitmap in a range.

TABLE 10

RACH Non-dedicated Preamble/signatures

| Information Element/ Group name | Type and reference | Semantics description |
|---|---|---|
| CHOICE mode | | |
| >FDD | | |
| Available Dedicated Signatures G1 | | |
| >>> Number of signatures | Integer (0, 4, 8, 16, 24) | consecutive signatures in the group |
| >>> Begin Signature Index | Integer (0, . . . , 63) | Index number of the first signature, present only if the number of signatures of the group is not zero |

TABLE 10-continued

RACH Non-dedicated Preamble/signatures

| Information Element/ Group name | Type and reference | Semantics description |
|---|---|---|
| >>Available Non-dedicated Signatures G2 | | |
| >>> Number of signatures | Integer (0, 4, 8, 16, 24, 32, 48, 64) | Number of consecutive signatures in the group |
| >>> Begin Signature Index | Integer (0, . . . , 63) | Index number of the first signature, present only if the number of signatures of the group is not zero |
| OR If signatures not consecutive | | |
| >>> Signature map | Bit string (64) | Set bit positions in the map indicate the indexes of available signatures in the group |
| >>Available Non-dedicated Signatures G3 | | |
| >>> Number of signatures | Integer (0, 4, 8, 16, 24, 32, 48, 64) | Number of consecutive signatures in the group |
| >>> Begin Signature Index | Integer (0, . . . , 63) | Index number of the first signature, present only if the number of signatures of the group is not zero |
| OR If signatures not consecutive [ | | |
| >>> Signature map | Bit string (64) | Set bit positions in the map indicating the indexes of available signatures in the group |

TABLE 11

RACH RA-RNTI Information

| Information Element/ Group name | Multi | Type and reference | Semantics description |
|---|---|---|---|
| RACH RA-RNTI Info | <1, . . . , maxRA-RNTI | | At least 2 for a RACH, 3 or more for better decoding |
| >RA-RNTI Code | | Bit String (12 or 16 or ?) | |
| >Burst Start subframe number | | Integer (0, . . . , 9) | A burst is a sub-frame |
| >Next Burst Distance | | Integer (4, . . . , 20) | N sub-frames, equivalent to the RACH response window size |

TABLE 12

PDCCH Information

| Information Element/ Group name | Need | Type and reference | Semantics description |
|---|---|---|---|
| PDCCH Info | MP | | |
| >PDCCH Format | MP | Enumerated (0, 1, 2, 3) | |

TABLE 12-continued

PDCCH Information

| Information Element/ Group name | Need | Type and reference | Semantics description |
|---|---|---|---|
| >PDCCH Scrambling | OP | Integer (0, . . . , x) | Index to the scrambling code tree |

Other than the SIBs mentioned above, the LTE network could also transmit a SIB 16 message which could carry some configuration parameters that the WTRU 101 could read and use when entering the LTE system during a handover from another RAT (3GPP or non-3GPP) to LTE. Alternatively, the LTE system could transmit a SIB 16 message or some other analogous dedicated RRC message which would carry parameters applicable for the non 3GPP RAT during a handover from LTE to other RAT (3GPP or non-3GPP). Such a message could have been possibly conveyed to the LTE system just before the handover procedure. This SIB 16 could contain a combination of parameters like some of the DRX parameters mentioned, some RACH and reselection parameters and any other physical layer parameters which might give the WTRU 101 some knowledge of the system.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:
1. A wireless transmit/receive unit (WTRU) comprising:
a receiver configured to receive physical random access channel (PRACH) system information from an eNo- deB, wherein the PRACH system information comprises a random access channel (RACH) response window size and a PRACH frequency position information;

the receiver configured to receive a RACH preamble and signature information;

a processor configured to generate a preamble sequence based on the received RACH preamble and signature information;

a transmitter configured to transmit the preamble sequence to the eNodeB, wherein the preamble sequence is transmitted on a resource, wherein the resource is determined based on the received PRACH frequency position information; and the receiver configured to receive a random access response from the eNodeB, wherein the random access response is received within a number of subframes, wherein the number of subframes is based on the RACH response window size.

2. The WTRU of claim 1, wherein the RACH response window size is indicated in terms of number of subframes.

3. The WTRU of claim 1, wherein the frequency position information is a physical resource block available for PRACH.

4. The WTRU of claim 1, wherein the RACH preamble is a RACH dedicated preamble or a RACH non-dedicated preamble.

5. The WTRU of claim 4, wherein the RACH non-dedicated preamble and signature information comprises one or more of a number of signatures, a begin signature index, or a signature map.

6. The WTRU of claim 1, wherein the resource further comprises PRACH frame structure.

7. A base station comprising:

a transmitter configured to transmit physical random access channel (PRACH) system information to a device, wherein the PRACH system information comprises a random access channel (RACH) response window size and a PRACH frequency position information;

the transmitter configured to transmit to the device a RACH preamble and signature information;

a receiver configured to receive a preamble sequence from the device, wherein the preamble sequence is in accordance with the RACH preamble and signature information, and wherein the preamble sequence is received on a resource in accordance with the PRACH frequency position information; and the transmitter configured to transmit a random access response to the device, wherein the random access response is transmitted within a number of subframes, wherein the number of subframes is in accordance with the RACH response window size.

8. The base station of claim 7, wherein the RACH response window size is indicated in terms of number of subframes.

9. The base station of claim 7, wherein the frequency position information is a physical resource block available for PRACH.

10. The base station of claim 7, wherein the RACH preamble is a RACH dedicated preamble or a RACH non-dedicated preamble.

11. The base station of claim 10, wherein the RACH non-dedicated preamble and signature information comprises one or more of a number of signatures, a begin signature index, or a signature map.

12. A first device comprising:

a transmitter configured to transmit physical random access channel (PRACH) system information to a second device, wherein the PRACH system information comprises a random access channel (RACH) response window size and a PRACH frequency position information;

the transmitter configured to transmit to the second device a RACH preamble and signature information;

a receiver configured to receive a preamble sequence from the second device, wherein the preamble sequence is in accordance with the RACH preamble and signature information, and wherein the preamble sequence is received on a resource in accordance with the PRACH frequency position information; and the transmitter configured to transmit a random access response to the second device, wherein the random access response is transmitted within a number of subframes, wherein the number of subframes is in accordance with the RACH response window size.

13. The first device of claim 12, wherein the resource further comprises PRACH frame structure.

14. The first device of claim 12, wherein the first device is a test equipment and the second device is a user equipment (UE).

15. The first device of claim 12, wherein the RACH response window size is indicated in terms of number of subframes.

16. The first device of claim 12, wherein the frequency position information is a physical resource block available for PRACH.

17. The first device of claim 12, wherein the RACH preamble is a RACH dedicated preamble or a RACH non-dedicated preamble.

18. The first device of claim 17, wherein the RACH non-dedicated preamble and signature information comprises one or more of a number of signatures, a begin signature index, or a signature map.

19. A method comprising:

receiving physical random access channel (PRACH) system information from an eNodeB, wherein the PRACH system information comprises a random access channel (RACH) response window size and a PRACH frequency position information;

receiving a RACH preamble and signature information;

generating a preamble sequence based on the received RACH preamble and signature information;

transmitting the preamble sequence to the eNodeB, wherein the preamble sequence is transmitted on a resource, wherein the resource is determined based on the received PRACH frequency position information; and receiving a random access response from the eNodeB, wherein the random access response is received within a number of subframes, wherein the number of subframes is based on the RACH response window size.

20. The method of claim 19, wherein the RACH response window size is indicated in terms of number of subframes.

21. The method of claim 19, wherein the frequency position information is a physical resource block available for PRACH.

22. The method of claim 19, wherein the RACH preamble is a RACH dedicated preamble or a RACH non-dedicated preamble.

23. The method of claim 22, wherein the RACH non-dedicated preamble and signature information comprises one or more of a number of signatures, a begin signature index, or a signature map.

24. The method of claim 19, wherein the resource further comprises PRACH frame structure.

25. A method comprising:
   transmitting physical random access channel (PRACH) system information to a device, wherein the PRACH system information comprises a random access channel (RACH) response window size and a PRACH frequency position information;
   transmitting to the device a RACH preamble and signature information;
   receiving a preamble sequence from the device, wherein the preamble sequence is in accordance with the RACH preamble and signature information, and wherein the preamble sequence is received on a resource in accordance with the transmitted PRACH frequency position information; and
   transmitting a random access response to the device, wherein the random access response is transmitted within a number of subframes, wherein the number of subframes is in accordance with the RACH response window size.

26. The method of claim 25, wherein the RACH response window size is indicated in terms of number of subframes.

27. The method of claim 25, wherein the frequency position information is a physical resource block available for PRACH.

28. The method of claim 25, wherein the RACH preamble is a RACH dedicated preamble or a RACH non-dedicated preamble.

29. The method of claim 28, wherein the RACH non-dedicated preamble and signature information comprises one or more of a number of signatures, a begin signature index, or a signature map.

* * * * *

UNITED STATES PATENT AND TRADEMARK OFFICE
CERTIFICATE OF CORRECTION

PATENT NO.         : 9,532,377 B2
APPLICATION NO.    : 14/918960
DATED              : December 27, 2016
INVENTOR(S)        : Shankar Somasundaram et al.

Page 1 of 1

It is certified that error appears in the above-identified patent and that said Letters Patent is hereby corrected as shown below:

In the Claims

Column 23, Line 19, Claim 25: Delete "transmitted"

Signed and Sealed this
Twenty-eighth Day of February, 2017

Michelle K. Lee
*Director of the United States Patent and Trademark Office*